United States Patent
Hu et al.

(10) Patent No.: US 7,773,640 B2
(45) Date of Patent: Aug. 10, 2010

(54) FIBER LASER DEVICE

(75) Inventors: Chieh Hu, Chiayi (TW); Shih-Ting Lin, Tainan (TW); Hsin-Chia Su, Yunlin County (TW); Yao-Wun Jhang, Chiayi (TW)

(73) Assignee: Industrial Technology Research Institute, Hsinchu (TW)

( * ) Notice: Subject to any disclaimer, the term of this patent is extended or adjusted under 35 U.S.C. 154(b) by 70 days.

(21) Appl. No.: 12/351,816

(22) Filed: Jan. 10, 2009

(65) Prior Publication Data

US 2010/0142563 A1 Jun. 10, 2010

(30) Foreign Application Priority Data

Dec. 10, 2008 (TW) .............................. 97148073 A

(51) Int. Cl.
*H01S 3/30* (2006.01)
(52) U.S. Cl. ............................................ 372/6; 385/38
(58) Field of Classification Search ...................... 372/6
See application file for complete search history.

(56) References Cited

U.S. PATENT DOCUMENTS

| 5,037,171 | A | * | 8/1991 | Lund et al. ..................... 385/38 |
| 5,805,631 | A | | 9/1998 | Xie et al. |
| 6,275,516 | B1 | | 8/2001 | Arney et al. |
| 2001/0012429 | A1 | * | 8/2001 | Wach et al. .................. 385/115 |

\* cited by examiner

*Primary Examiner*—Minsun Harvey
*Assistant Examiner*—Kinam Park
(74) *Attorney, Agent, or Firm*—Jianq Chyun IP Office

(57) ABSTRACT

A fiber laser device includes a laser pump for irradiating a laser beam, an optical component, an optical fiber and an optical sensor. The optical component has a first and a second output end, wherein a portion of the laser beam is output from the first output end and another portion of the laser beam is output from the second output end. The optical fiber including a core and a cladding layer is optically coupled between the laser pump and the optical component. A inclined angle θ of the first output end satisfies the following relations that $\theta_{NA}/2 \leq \theta \leq \theta_{NA}$, and $\theta_{NA}=\sin^{-1}(NA \cdot n_{cladding}/n_{core})$, where NA is numerical aperture of optical fiber, $n_{core}$ is refractive index of the core, and $n_{cladding}$ is refractive index of the cladding layer. The optical sensor is disposed at a light-transmission path of the laser beam reflected by the first output end.

13 Claims, 3 Drawing Sheets

FIBER LASER DEVICE

CROSS-REFERENCE TO RELATED APPLICATION

This application claims the priority benefit of Taiwan application serial no. 97148073, filed on Dec. 10, 2008. The entirety of the above-mentioned patent application is hereby incorporated by reference herein and made a part of this specification.

BACKGROUND OF THE INVENTION

1. Field of the Invention

The present relates to a laser output end device, and more particularly, to a fiber laser device.

2. Description of Related Art

Fiber laser device is first proposed in 1964, the power thereof is several milli-watts. In conventional fiber laser device, laser diode serves as an exciting pump, optical fibers used in conventional fiber laser device are a kind of single cladding fibers, and laser beam is directly coupled to and transmitted in the core of the optical fiber. Usually, the composition of the core is plastic or glass. Since the transmission of optical fibers is not interfered by electromagnetic wave and has few decay, optical fibers are gradually applied in various fields.

Recently, due to the double cladding fibers are proposed and enhancement of photoelectric transduction efficiency, the power of fiber laser devices increases rapidly year by year. Nowadays, high power fiber laser devices having several kilowatts (KW) is already developed.

High power fiber laser devices have gradually become the mainstream product in the market. In order to ensure that high power fiber laser devices can output stably, a real time power measuring system for monitoring output of the fiber laser devices is required.

In one prior art, in order to measure output of fiber laser devices, an optical sensor for measuring output of fiber laser devices is installed at a laser output end of fiber laser devices. In another prior art, in order to measure output of fiber laser devices, a beam splitter is installed at a laser output end of fiber laser devices to split the laser beam into two split beams, and an optical sensor is installed on light-transmission path of one of the split beams. In this way, output of fiber laser devices can be measured. Detailed descriptions regarding the prior art measurements are provided below with reference to FIG. 1 and FIG. 2.

FIG. 1 schematically illustrates a cross-sectional view of a conventional fiber laser device. Referring to FIG. 1, a conventional fiber laser device 100 includes a laser pump (not shown), an optical fiber 102, and an optical sensor 104, wherein the optical fiber 102 further includes a core 102a and a cladding layer 102b, and the core 102a is wrapped by the cladding layer 102b.

As shown in FIG. 1, in order to estimate the overall power of the fiber laser device 100, a portion of the cladding layer 102b of the optical fiber is stripped such that a notch A shown in FIG. 1 is formed. An optical sensor 104 is then disposed at the notch A to measure power of the fiber laser device 100 irradiated from the notch A. The overall power of the fiber laser device 100 can be estimated in accordance with power of the fiber laser device 100 irradiated from the notch A. The overall power of the fiber laser device 100 can be modified in accordance with the measuring result (notch A) so as to stabilize the overall power of the fiber laser device 100. However, the optical fiber 102 is damaged when a portion of the cladding layer 102b of the optical fiber is stripped. The optical signal transmitted in the core 102a is decayed and the overall power of the fiber laser device 100 is reduced accordingly.

FIG. 2 schematically illustrates a cross-sectional view of another conventional fiber laser device. Referring to FIG. 2, a conventional fiber laser device 200 includes a laser pump (not shown), an optical fiber 202, an optical sensor 204, and a beam splitter 206, wherein the optical fiber 102 includes a first optical fiber 202a and a second optical fiber 202b; a laser beam 208 is irradiated by the laser pump; the beam splitter 206 is disposed between the first optical fiber 202a and the second optical fiber 202b so as to split the laser beam 208 into a first laser beam 208a and a second laser beam 208b. Additionally, the optical sensor 204 is disposed on light-transmission path of the second laser beam 208b so as to measure power of the second laser beam 208b and estimate power of the first laser beam 208a. The overall power of the fiber laser device 200 can be modified in accordance with power of the second laser beam 208b so as to stabilize the overall power of the fiber laser device 200.

In the measurement shown in FIG. 2, not only the optical fiber 202 is damaged, but also the laser beam 208 is split into the first laser beam 208a and the second laser beam 208b. Additionally, the fiber laser device 200 only output of the second laser beam 208b. In other words, the overall power of the fiber laser device 200 is reduced because the overall power of the fiber laser device 200 is equal to power of the second laser beam 208b.

SUMMARY OF THE INVENTION

The present invention is directed to a fiber laser device having an optical sensor for measuring power of a portion of laser beam reflected by output end inherently.

As embodied and broadly described herein, a fiber laser device including a laser pump, an optical component, an optical fiber, and an optical sensor is provided. The laser pump is suitable for irradiating a laser beam. The optical component has a first output end and a second output end, wherein a portion of the laser beam is output from the first output end, and another portion of the laser beam is reflected by the first output end and output from the second output end. The optical fiber is optically coupled between the laser pump and the optical component. The optical fiber includes a cladding layer and a core wrapped by the cladding layer, wherein an inclined angle θ of the first output end satisfies the following relations that $\theta_{NA}/2 \leq \theta \leq \theta_{NA}$, and $\theta_{NA} = \sin^{-1}(NA \cdot n_{cladding}/n_{core})$, where NA is numerical aperture of optical fiber, $n_{core}$ is refractive index of the core, and $n_{cladding}$ is refractive index of the cladding layer. The optical sensor is disposed at a light-transmission path of the laser beam reflected by the first output end.

Since the fiber laser device of the present invention adapts an optical sensor to measure power of a portion of laser beam reflected by the first output end inherently, the power of fiber laser device can be estimated precisely without damaging the optical fiber.

In order to make the aforementioned and other objects, features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

First Embodiment

Figure 1:
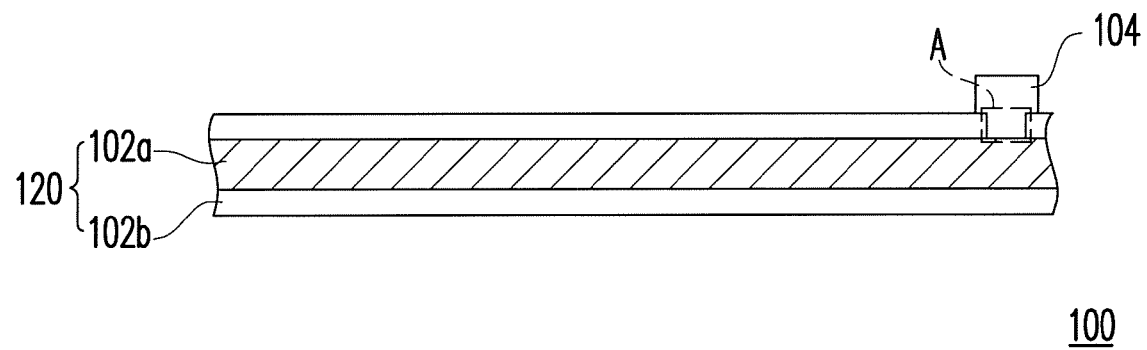
FIG. 1 schematically illustrates a cross-sectional view of conventional fiber laser device.
Figure 2:
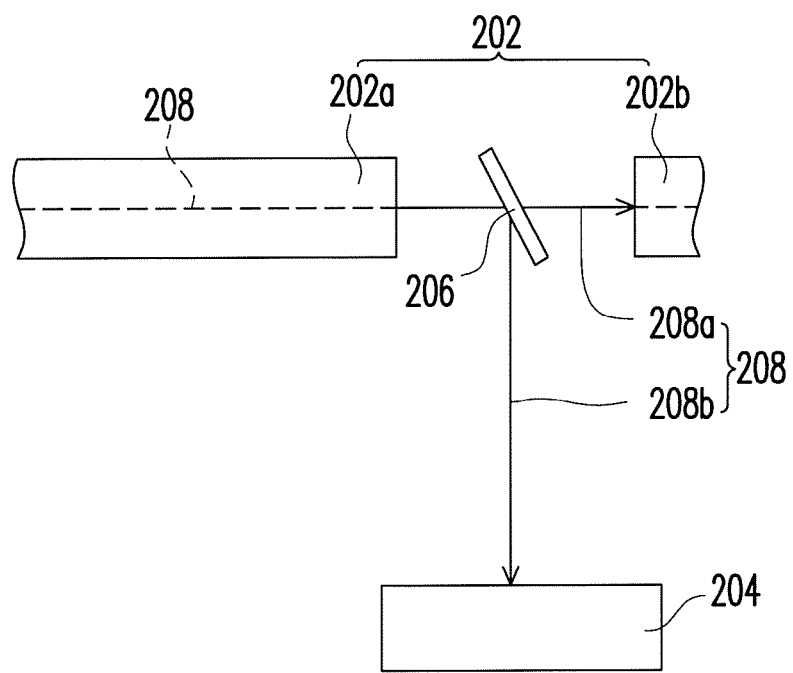
FIG. 2 schematically illustrates a cross-sectional view of another conventional fiber laser device.
Figure 3A:
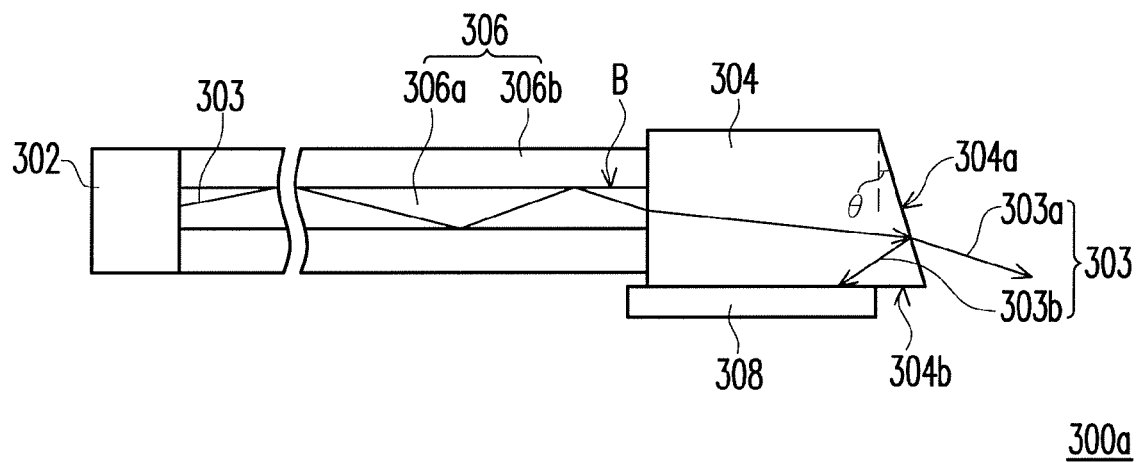
FIG. 3A schematically illustrates a cross-sectional view of a fiber laser device in accordance with the first embodiment of the present invention.
Figure 3B:
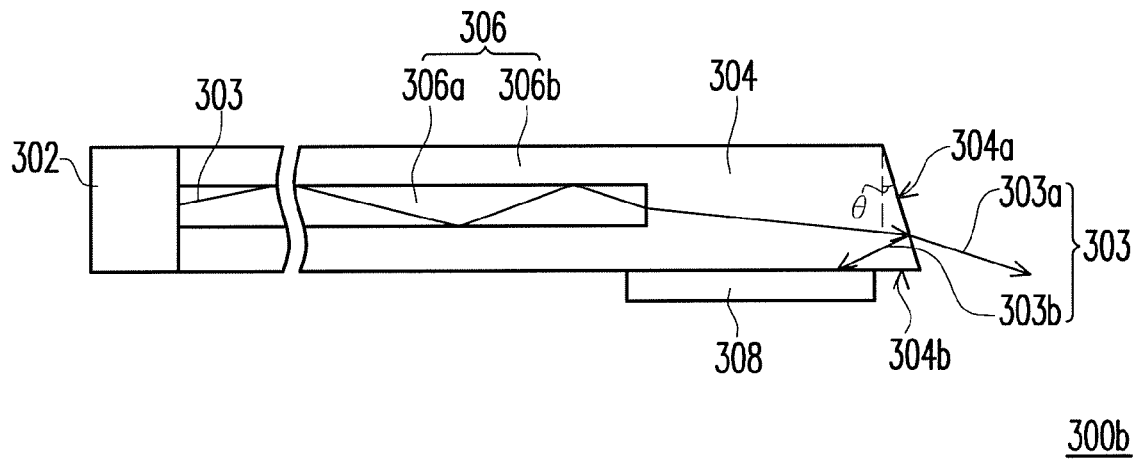
FIG. 3B schematically illustrates a cross-sectional view of another fiber laser device in accordance with the first embodiment of the present invention.

FIG. 3A and FIG. 3B schematically illustrate cross-sectional views of a fiber laser device in accordance with the first embodiment of the present invention. Referring to FIG. 3A and FIG. 3B, the fiber laser device $300a$ and $300b$ include a laser pump 302, an optical component 304, an optical fiber 306, and an optical sensor 308.

The laser pump 302 in the fiber laser device $300a$ and $300b$ is suitable for irradiating a laser beam 303. In the present embodiment, the laser pump 302 is a solid state laser such as a laser diode (LD).

The optical component 304 is a prism or a graded index lens (GRIN lens), for example. The above-described prism can be made of glass. Additionally, the GRIN lens is a columnar lens, wherein refractive index gradually increases from center to periphery of the GRIN lens. Additionally, the optical component 304 may be a non-core fiber as shown in FIG. 3B.

As shown in FIG. 3A, the optical component 304 of the present embodiment has a first output end $304a$ and a second output end $304b$ connected to the first output end $304a$.

The optical fiber 306 is optically coupled between the laser pump 302 and the optical component 304. For example, the optical component 304 and the optical fiber 306 are optically coupled to each other by carbon dioxide laser bonding or chemical bonding. Refractive index difference between the optical component 304 and the optical fiber 306 at the bonding interface is reduced such that energy loss of the laser beam resulted from refractive index difference is minimized accordingly. Additionally, the fiber laser device $300a$ may further include a ferrule (not shown) connected to the optical fiber 306. The ferrule is optically coupled to the optical component 304 so as to increase heat dissipation area of the optical fiber 306 and prevent the optical fiber 306 from being softened.

The optical fiber 306 includes a cladding layer $306b$ and a core $306a$ wrapped by the cladding layer $306b$, wherein an inclined angle $\theta$ of the first output end $304a$ satisfies the following relations that $\theta_{NA}/2 \leq \theta \geq \theta_{NA}$, and $\theta_{NA} = \sin^{-1}(NA \cdot n_{cladding}/n_{core})$, where NA is numerical aperture of optical fiber 306, $n_{core}$ is refractive index of the core $306a$, and $n_{cladding}$ is refractive index of the cladding layer $306b$. Additionally, refractive index of the core $306a$ $n_{core}$ is greater than refractive index of the cladding layer $306b$ $n_{cladding}$.

Base on principle of optics, when light propagates from an optical dense medium (i.e. medium having high refractive index) to an optical less dense medium (i.e. medium having low refractive index), light is refracted towards the normal line of the interface of the optical dense and the optical less dense medium. Additionally, light propagates along the interface of the optical dense medium having and the optical less dense medium having when light-incident angle is greater than critical angle. When light-incident angle is greater than critical angle, all the refracted light returns to the optical dense medium having high refractive index. The phenomenon is so-call total reflection. In optical fibers, light (optical signal) is transmitted within the core via total reflection. Specifically, when the laser beam 303 propagates from the core $306a$ to the cladding layer $306b$, a total reflection occurs at interface B and the laser bean 303 is reflected back into the core $306a$. Accordingly, the laser beam 303 is transmitted in the core $306a$ with less energy loss.

Referring to FIG. 3A, when the laser beam 303 propagates from the fiber 306 to the optical component 304 and arrives the first output end $304a$, a great portion of the laser beam 303 (i.e. laser beam $303a$) is output from the first output end $304a$ and a small portion of the laser beam 303 (i.e. reflected laser beam $303b$) is reflected by the first output end $304a$ to output from the second output end $304b$. The optical sensor 308 is disposed at light-transmission path of the reflected laser beam $303b$. In the present embodiment, the optical sensor 308 is disposed on the second output end $304b$ such that the optical sensor 308 can measure power of the reflected laser beam $303b$. According to a power ratio of the laser beam $303a$ and the reflected laser beam $303b$ obtained from experiments, power of the laser beam $303a$ is estimated. Since the relationship between power of laser beam $303a$ and power of the reflected laser beam $303b$ is almost linear, power of the fiber laser device 300 can be estimated precisely. In this way, actual power of the fiber laser device 300 can be modified in accordance with power of the laser beam $303a$ so as to stabilize the overall power of the fiber laser device $300a$.

It is noted that the measuring method of the present embodiment estimates actual power of the fiber laser device $300a$ through measuring power of the reflected laser beam $303b$. Since the reflected laser beam $303b$ exits inherently when the fiber laser device $300a$ outputs the laser beam $303a$, the laser beam $303a$ does not result in additional power-loss of the fiber laser device $300a$. In additional, power of the fiber laser device $300a$ is measured without damaging the optical fiber 306.

In the following embodiment and drawings, the same or like numbers stand for the same or like elements for simple illustration.

Second Embodiment

Figure 4:
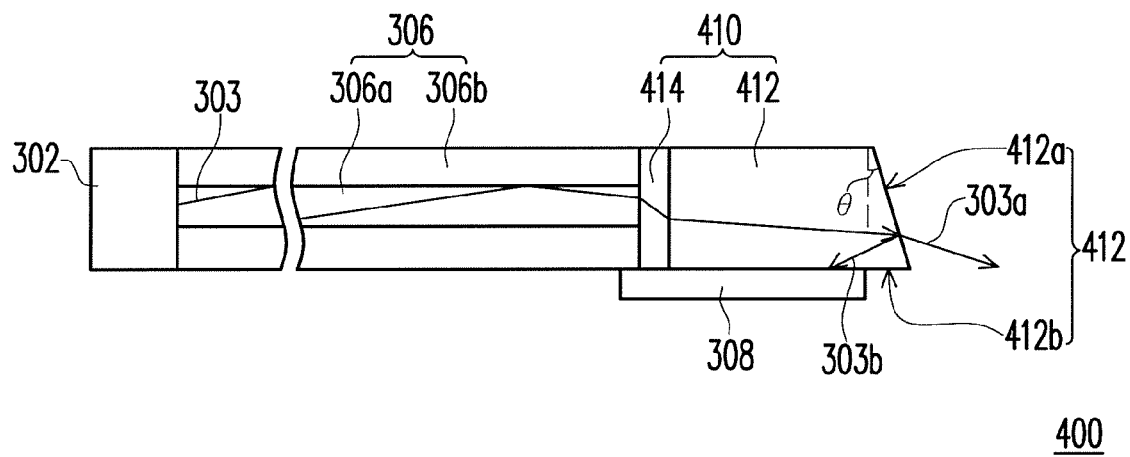
FIG. 4 schematically illustrates a cross-sectional view of a fiber laser device in accordance with the second embodiment of the present invention.

FIG. 4 schematically illustrates a cross-sectional view of a fiber laser device in accordance with the second embodiment of the present invention. Referring to FIG. 4, the fiber laser device 400 of the present embodiment is similar with the fiber laser device $300a$ of the first embodiment except that the optical component 410 shown in FIG. 4 further includes an optical plate 414. Specifically, the optical component 410 of the present embodiment includes a GRIN lens and an optical plate 414 optically coupled to the GRIN lens 412 and the optical fiber 306, wherein the optical plate 414 is a glass plate, for example.

Additionally, similar with the optical component 304, the GRIN lens 412 has a first output end 412a and a second output end 412b connected to the first output end 412a.

Third Embodiment

Figure 5:
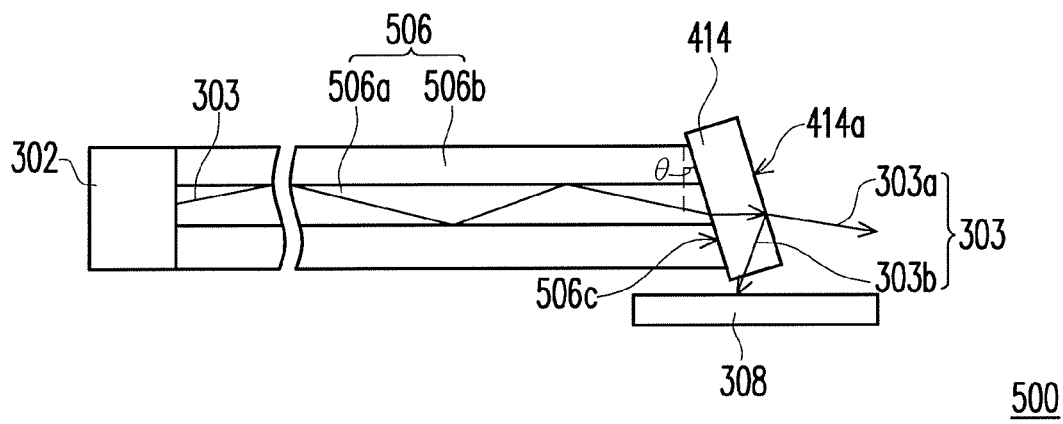
FIG. 5 schematically illustrates a cross-sectional view of a fiber laser device in accordance with the third embodiment of the present invention.

FIG. 5 schematically illustrates a cross-sectional view of a fiber laser device in accordance with the third embodiment of the present invention. Referring to FIG. 5, the fiber laser device 500 of the present embodiment includes a laser pump 304, an optical fiber 506, an optical plate 414, and an optical sensor 308, wherein the laser pump 302 is suitable for irradiating a laser beam 303.

As shown in FIG. 5, the optical fiber 506 is optically coupled between the laser pump 302 and the optical plate 414. The optical fiber 506 includes a cladding layer 506b and a core 506a wrapped by the cladding layer 506b, wherein an inclined angle θ of the first output end 506a satisfies the following relations that $\theta_{NA}/2 \leq \theta \leq \theta_{NA}$, and $\theta_{NA} = \sin^{-1}(NA \cdot n_{cladding}/n_{core})$, where NA is numerical aperture of optical fiber 506, $n_{core}$ is refractive index of the core 506a, and $n_{cladding}$ is refractive index of the cladding layer 506b. Additionally, refractive index of the core 506a $n_{core}$ is greater than refractive index of the cladding layer 506b $n_{cladding}$.

The optical plate 414 is optically coupled to the first output end 506c, wherein the optical plate 414 has a second output end 414a, a portion of the laser beam 303 output from the first output end 506c is output from the second output end 414a, and another portion of the laser beam 303 output from the first output end 506c is reflected by the second output end 414a.

The optical sensor 308 is disposed a light-transmission path of the laser beam 303b reflected by the second output end 414a. Similar with the fiber laser device 300, the fiber laser device 500 of the present embodiment estimates actual power of the laser beam 303a by measuring power of the reflected laser beam 303b via the optical sensor 308.

In the present invention, power of the fiber laser device can be measured without damaging the optical fiber thereof such that the fiber laser device can be measured easily and is cost-effective. Additionally, in the present invention, power of the fiber laser device is measured without affecting actual output thereof, real time output of the fiber laser device can be estimated precisely and monitored easily. Accordingly, the fiber laser device of the present invention provides a high power laser beam with high stability.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A fiber laser device, comprising:
   a laser pump for irradiating a laser beam;
   an optical component having a first output end and a second output end, wherein a portion of the laser beam is output from the first output end, and another portion of the laser beam is reflected by the first output end and output from the second output end;
   an optical fiber optically coupled between the laser pump and the optical component, the optical fiber comprising a cladding layer and a core wrapped by the cladding layer, wherein an inclined angle of the first output end is θ, $\theta_{NA}/2 \leq \theta \leq \theta_{NA}$, and $\theta_{NA} = \sin^{-1}(NA \cdot n_{cladding}/n_{core})$, NA is numerical aperture of the optical fiber, $n_{core}$ is refractive index of the core, and $n_{cladding}$ is refractive index of the cladding layer; and
   an optical sensor disposed at a light-transmission path of the laser beam reflected by the first output end.

2. The fiber laser device of claim 1, wherein the laser pump comprises a fiber laser pump, a solid state laser, or a laser diode.

3. The fiber laser device of claim 1, wherein the optical component is a prism having the first output end and the second output end.

4. The fiber laser device of claim 3, wherein the prism is a glass prism.

5. The fiber laser device of claim 1, wherein the optical component is a graded index lens having the first output end and the second output end.

6. The fiber laser device of claim 1, wherein the optical component comprises:
   a graded index lens having the first output end and the second output end connected to the first output end; and
   an optical plate connected between the graded index lens and the optical fiber.

7. The fiber laser device of claim 6, wherein the optical plate is a glass plate.

8. The fiber laser device of claim 1, wherein the optical component is a non-core fiber.

9. The fiber laser device of claim 1, wherein the optical sensor is disposed on the second output end to measure the laser beam reflected by the first output end.

10. A fiber laser device, comprising:
    a laser pump for irradiating a laser beam; an optical plate is configured to couple the laser beam to a first output end of the optical plate, wherein the optical plate has a second output end, a portion of the laser beam output from the first output end is output from the second output end, and another portion of the laser beam output from the first output end is reflected by the second output end;
    an optical fiber optically coupled between the laser pump and the optical plate, the optical fiber comprising a cladding layer and a core wrapped by the cladding layer, wherein an inclined angle of the first output end is θ, $\theta_{NA}/2 \leq \theta \leq \theta_{NA}$, and $\theta_{NA} = \sin^{-1}(NA \cdot n_{cladding}/n_{core})$, NA is numerical aperture of the optical fiber, $n_{core}$ is refractive index of the core, and $n_{cladding}$ is refractive index of the cladding layer; and
    an optical sensor disposed at a light-transmission path of the laser beam reflected by the second output end.

11. The fiber laser device of claim 10, wherein the laser pump comprises a fiber laser pump, a solid state laser, or a laser diode.

12. The fiber laser device of claim 10, wherein the optical plate is a glass plate.

13. The fiber laser device of claim 10, wherein the optical component and the optical fiber are optically coupled to each other by carbon dioxide laser bonding or chemical bonding such that refractive index difference between the optical component and the optical fiber at a bonding interface is reduced.

* * * * *